United States Patent [19]
Coad et al.

[11] Patent Number: 5,966,652
[45] Date of Patent: Oct. 12, 1999

[54] SYSTEM AND METHOD FOR THE INSERTION AND EXTRACTION OF TELEPHONE NUMBERS FROM A WIRELESS TEXT MESSAGE

[75] Inventors: Michael T. Coad, Overland Park, Kans.; Jason B. Kenagy, La Jolla, Calif.

[73] Assignee: QUALCOMM Incorporated, San Diego, Calif.

[21] Appl. No.: 08/705,467

[22] Filed: Aug. 29, 1996

[51] Int. Cl.[6] .................................................... H04Q 7/12
[52] U.S. Cl. ......................... 455/412; 455/414; 455/415; 455/466; 455/566
[58] Field of Search ..................................... 455/412, 414, 455/415, 466, 556, 564, 566, 575; 379/140

[56] References Cited

U.S. PATENT DOCUMENTS

| | | | |
|---|---|---|---|
| 4,747,122 | 5/1988 | Bhagat et al. | 379/57 |
| 4,994,797 | 2/1991 | Breeden | 340/825.44 |
| 5,063,588 | 11/1991 | Pasioskas et al. | 455/415 |
| 5,117,449 | 5/1992 | Metroka et al. | 455/552 |
| 5,148,473 | 9/1992 | Freeand et al. | 455/557 |
| 5,251,250 | 10/1993 | Obata et al. | 455/412 |
| 5,274,699 | 12/1993 | Ranz | 455/415 |
| 5,398,279 | 3/1995 | Frain | 379/140 |
| 5,541,976 | 7/1996 | Ghisler | 455/426 |
| 5,592,532 | 1/1997 | Koizumi | 455/412 |
| 5,636,266 | 6/1997 | Ranganath et al. | 455/566 |

FOREIGN PATENT DOCUMENTS

| | | | |
|---|---|---|---|
| 0458563 | 11/1991 | European Pat. Off. | H04Q 7/04 |
| 9214329 | 8/1992 | WIPO | H04M 3/42 |

*Primary Examiner*—Wellington Chin
*Assistant Examiner*—Yemane Woldetatios
*Attorney, Agent, or Firm*—Russell B. Miller; Roger W. Martin; Charles D. Brown

[57] ABSTRACT

A system uses conventional text messaging capabilities of cellular telephone systems to embed one or more call-back telephone numbers. A start delimiter is used to separate a text data portion corresponding to the call-back telephone number from the text message. A termination delimiter may be used to indicate the end of the text data portion corresponding to the call-back telephone number. Multiple text data portions, corresponding to multiple call-back telephone numbers, may be inserted using multiple start delimiters and termination delimiters. A text parser in the cellular telephone searches the text message for the start delimiter and extracts the text data portion corresponding to the call-back telephone number. The cellular telephone user selects a desired call-back telephone number, which may be placed in a dialing queue for simplified communications between the cellular telephone and a destination corresponding to the selected call-back telephone number.

26 Claims, 8 Drawing Sheets

--PRIOR ART--

SYSTEM AND METHOD FOR THE INSERTION AND EXTRACTION OF TELEPHONE NUMBERS FROM A WIRELESS TEXT MESSAGE

BACKGROUND OF THE INVENTION

I. Field of the Invention

The present invention relates to wireless communication systems. More particularly, the present invention relates to a novel and improved system and method for the insertion and extraction of telephone numbers from a wireless alphanumeric text message

II. Description of the Related Art

Remote communication with individuals has become increasingly important in a mobile society. Early versions of devices, such as pagers, transmitted a signal to a paging device worn by the user. However, the paging device did little more than provide a beep indicating that a message had been sent to the user. The user had to call a predetermined telephone number to receive the actual message. These early paging devices were replaced with text messaging devices that include a small display that permits the transmission of a text message, such as the message sender's telephone number. While the text messaging pager provided additional data to the user, the user still had to use a separate telephone device to contact the message sender, or to take action in accordance with the message.

Cellular telephones provide yet another form of remote communication. As with early pager designs, early cellular telephone technology simply provided audio communication with the cellular telephone user. These telephone systems did not permit text messaging. However, new cellular telephone designs include a short message services (SMS) message in which alphanumeric text may be transmitted to the cellular telephone for display. This feature is similar to text messaging in pagers. Industry standards exist to define SMS messaging for cellular telephone communications. One such standard, used for spread spectrum cellular systems, is TIA/EIA/IS-637, entitled "Short Message Services for Wideband Spread Spectrum Cellular Systems" (hereinafter called "SMS standard").

The SMS standard includes a "call-back" data field that permits simple call-back operation by the cellular telephone user. However, the message sender must create an alphanumeric text message, and must complete the call-back data field with the desired telephone number. The cellular telephone uses the telephone number in the call-back data field to program a calling queue within the cellular telephone. Thus, with the call-back data field, the user need only press a "SEND" key on the cellular telephone to call the message sender.

While SMS call-back data fields are convenient for the cellular telephone user, they are inconvenient for the message sender since multiple data fields, including the text message field and the call-back data field, must be completed by the message sender. Furthermore, many potential message senders do not have equipment which supports SMS call-back data fields. In addition, many cellular service providers include text messaging, such as SMS messages, but do not include the call-back data field capability. Thus, even when a message sender completes the call-back data field, the cellular service provider may not have this capability and thus the cellular telephone user does not have the simplified call-back procedures envisioned by those responsible for the creation of the SMS standard.

Therefore, it can be appreciated that there is a significant need for a system and method that permits the insertion of data within the text message itself that can easily be extracted by the cellular telephone and used to simplify the call-back process. The present invention provides this and other advantages as will be illustrated by the following description and accompanying figures.

SUMMARY OF THE INVENTION

The present invention is a novel and improved system and method for the detection and extraction of telephone numbers from a text message received by a cellular telephone in a cellular telephone system. The cellular telephone includes a receiver that receives a text message. The text message includes a predetermined first delimiter. A display in the cellular telephone displays at least a portion of the received text message. A text parser coupled to the receiver analyzes the received text message and extracts a text data portion from the text message using the first delimiter. Thus, the text data portion is extracted from the text message using the first delimiter and is used to generate a call-back telephone number corresponding to the text data portion.

The cellular telephone may also include a dialed digits storage area to receive and store the text data portion as a destination telephone number to be called by the cellular telephone. The cellular telephone has a transmitter to transmit the stored destination telephone number and thereby establish its cellular telephone communication with a destination telephone corresponding to the destination telephone number.

In one embodiment, a second delimiter may be used at the end of the text data portion such that the first delimiter indicates the beginning of the text data portion and the second delimiter indicates the termination of the text data portion. The text message may also include a plurality of text data portions, each containing the first delimiter. The text parser separates each of the plurality of text data portions using the first delimiter and displays the plurality of text data portions on the display. In this embodiment, the cellular telephone includes a keypad having at least one key operable by a user to select one of the plurality of text data portions displayed on the display. The selected text data portion can be stored in the dialed digits storage area as the destination telephone number and transmitted to establish the cellular telephone connection.

The present invention requires the insertion of text data portions within the text message itself. A message generator generates an alphanumeric text message for transmission to a cellular telephone. The text message includes the first text delimiter to delimit the text data portion corresponding to a call-back telephone number. A cellular system transmitter transmits the text message to the cellular telephone. The cellular telephone receiver receives the text message and extracts the call-back telephone number in the manner described above. Thus, a text message may be conveniently generated for transmission by the cellular service provider. The transmitted text message itself contains text data portions that can be readily extracted by the cellular telephone and used to provide one or more call-back numbers.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
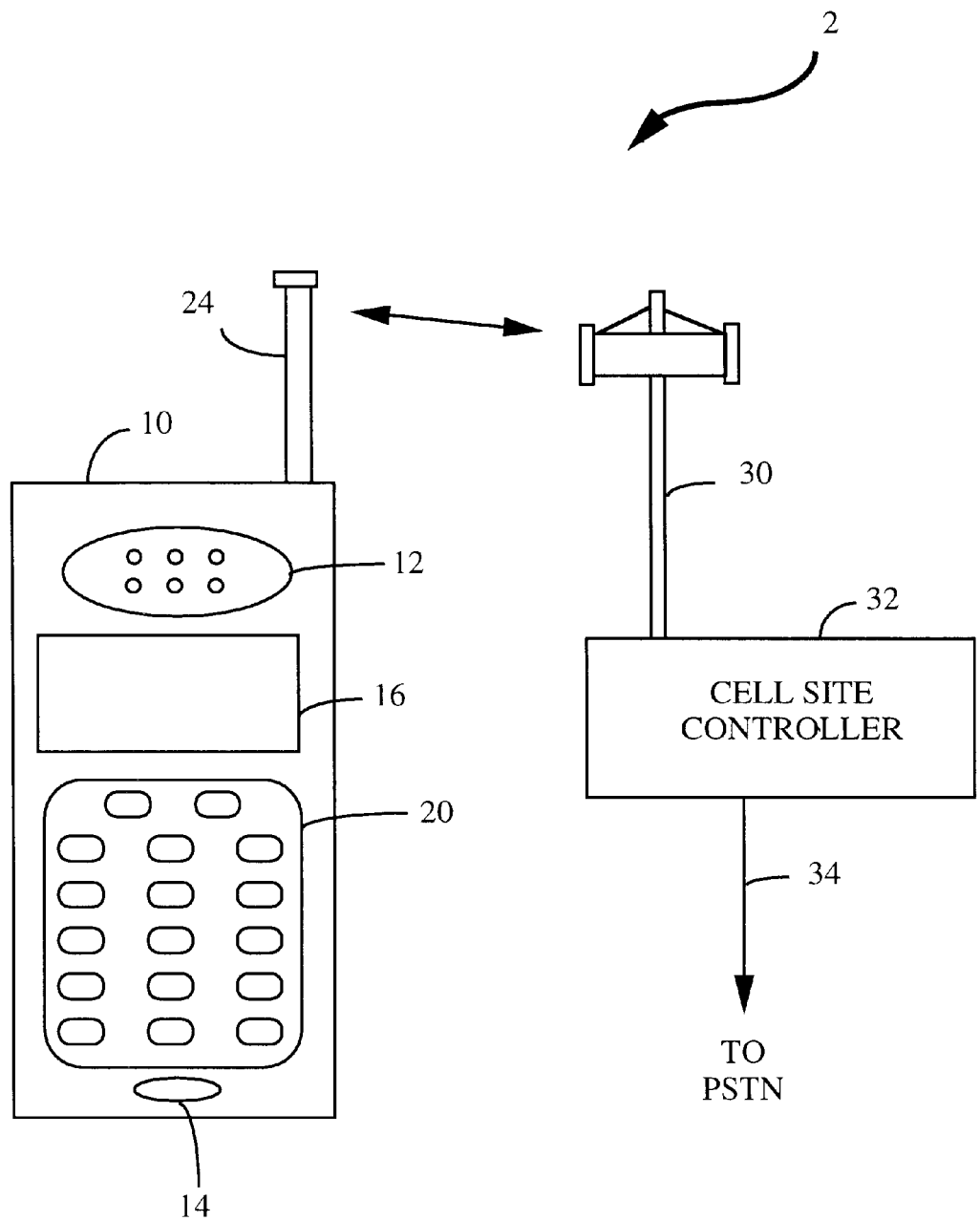
FIG. 1 is a functional block diagram illustrating the operation of a conventional cellular telephone with a cell site controller.

Text messaging capabilities are provided by most cellular service providers. However, as previously discussed, the call-back data field defined in the SMS standard is not supported by some cellular service providers. Another significant drawback to the current text messaging is that the call-back data field defined in the SMS standard provides only one call-back telephone number. The present invention advantageously permits the transmission of one or more embedded call-back telephone numbers that are embedded into a text message and are automatically extracted by the cellular telephone.

To assist in the understanding of the present invention, a conventional cellular telephone system will be briefly discussed. A conventional cellular telephone system 2 is illustrated in the functional block diagram of FIG. 1. A conventional cellular telephone 10 contains a speaker 12 and a microphone 14. A display 16, such as a liquid crystal display, displays the received text message. A keypad 20 is operated by the user to dial outgoing telephone numbers, and to select operational functions of the cellular telephone 10. An antenna 24 on the cellular telephone 10 is coupled to an internal transmitter/receiver (not shown). Other conventional components of the cellular telephone 10, such as a battery, are omitted from FIG. 1 for the sake of brevity. However, these components are well known by those of ordinary skill in the art and need not be described herein.

The antenna 24 provides a radio link between the cellular telephone 10 and a cell site antenna 30. A cell site controller 32 coupled to the cell site antenna 30 controls communications with the cellular telephone 10. The cell site controller 32 is coupled via a communications link 34 to a conventional telephone system, such as a Public Switched Telephone Network (PSTN) (not shown) or the like. The communications link 34 may be a direct land line, or a radio communications link, such as a microwave link, satellite link, or the like.

FIG. 1 illustrates the operation of a single cellular telephone 10 with a single cell site controller 32. However, those of ordinary skill in the art readily understand that the cell site controller 32 may be communicating with a large number of cellular telephones. In addition, a particular geographic area, such as a city, will have many cell site controllers providing overlapping cellular telephone coverage. Conventional techniques are used to determine the particular cell site with which the cellular telephone 10 will communicate. Furthermore, if the cellular telephone 10 is being used in an automobile, it may be necessary to switch the cellular telephone from one cell site controller to another. However, the operation of the one or more cell site controllers with the cellular telephone 10 is well known in the art and need not be described in detail herein.

A portion of the transmission from the cell site controller 32 to the cellular telephone 10 may include a text message. Typically, the text message is transmitted from the cell site controller 32 to the cellular telephone 10 using the SMS standard. The SMS standard has been adopted by the cellular telephone industry and is well known. As such, it need not be described in detail herein except as it relates to the present invention. The text message transmitted from the cell site controller 32 to the cellular telephone 10 is displayed on the display 16.

The present invention is directed to a system and method for inserting and extracting dialable telephone numbers within the text message itself. The text message may include one or more text data portions corresponding to call-back telephone numbers. For purposes of the present application, a "call-back telephone number" is a telephone number transmitted to a cellular telephone that provides the user with a destination telephone number. As will be discussed in detail below, the text data portion may contain the actual call-back telephone number or data corresponding to the call-back telephone number. For convenience, the text data portion corresponding to the call-back telephone number will be referred to simply as the call-back telephone number. It is not required that the call-back telephone number provide a return telephone number to the message sender. The present invention utilizes the widely supported conventional text messaging, but permits the transmission and extraction of multiple call-back telephone numbers within the text message thus overcoming two significant disadvantages of the prior art.

Figure 2:
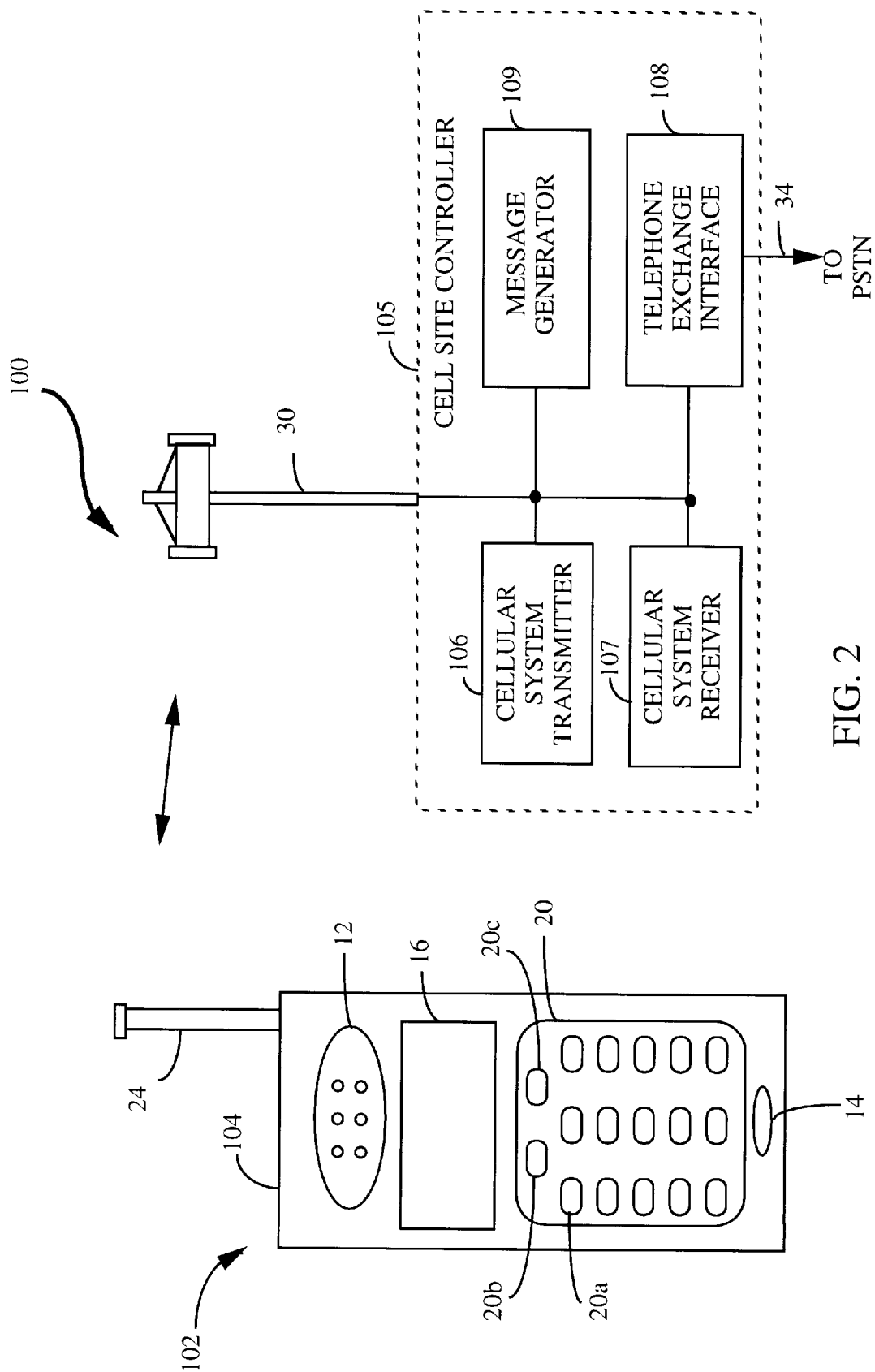
FIG. 2 is a functional block diagram illustrating the operation of the present invention.

The present invention is embodied in a system 100, illustrated in the functional block diagram of FIG. 2. The system 100 includes a cellular telephone 102 contained within a housing 104. Many components of the cellular telephone 102, such as the speaker 12, microphone 14, display 16, keypad 20, and antenna 24 are conventional components and need not be described in detail herein except as they relate to the techniques for detecting and extracting text data portions corresponding to call-back telephone numbers. The cellular telephone 102 includes a "SEND" key 20a, which is activated by the user to answer a call to the cellular telephone, or to place a call from the cellular telephone. The cellular telephone 102 includes function keys 20b and 20c to perform various functions, such as the selection of the desired call-back telephone number from a plurality of call-back telephone numbers. The operation of the function keys 20b and 20c will be described in greater detail below. It should be noted that although the present invention is disclosed herein with reference to an exemplary keypad 20, other user interfaces which are capable of function activation, such as voice activation, joysticks, touch screens, dial shuttles, and the like may be used with the present invention to perform the functions described herein.

FIG. 2 illustrates the operation of the cellular telephone 102 with a single cell site controller 105. As discussed above with respect to the conventional cellular telephone system 2 (see FIG. 1), a geographic area may be served by a number of cell site controllers having overlapping coverage. With the system 100, a particular geographic area may include a plurality of cell site controllers 105. The cellular telephone 102 may be communicating with one or more cell site controllers 105. This is especially true if the cellular telephone 102 is in an automobile and travels from one location in a city to another. The present invention is intended to encompass communications between one or more cellular telephones 102 and one or more cell site controllers 105 in a cellular system network. However, for the sake of convenience, the present description will refer only to the cell site controller 105. Additionally, although the present invention is disclosed herein with reference to a cellular system, it will be readily understood by one skilled in the art that the present invention is equally applicable to other wireless communication systems such as wireless local loop, Personal Communication Services (PCS), satellite systems, and the like.

The text message containing one or more embedded call-back telephone numbers is generated with the cooperation of the cellular service provider. The system 100 also includes a cell site controller 105. The cell site controller 105 contains a cellular system transmitter 106, a cellular system receiver 107, and a telephone exchange interface 108. The cellular system transmitter 106 transmits data, including the text message containing embedded call-back telephone numbers, to the cellular telephone 102 using the antenna 30. The cellular system receiver 107 receives data, such as voice data and call-back telephone numbers from the cellular telephone 102. The telephone exchange interface couples the cell site controller 105 to the communications line 34 in a conventional manner. As described above with respect to the conventional cell site controller 32 (see FIG. 1), the communications line 34 couples the cell site controller 105 to the conventional telephone system (not shown).

A message generator 109 within the cell site controller 105 is used to generate the text message containing one or more embedded call-back telephone numbers. The text message containing the call-back telephone numbers is generated in cooperation with the cellular service provider so that the text message transmitted by the cellular system transmitter 106 contains appropriate data characters to permit the extraction of the call-back telephone number. The transmitted text message includes predetermined delimiter characters to permit the identification and extraction of call-back telephone numbers. The message generator 109 must generate the text message using appropriate delimiter characters for the cellular telephone 102.

The predetermined delimiter is used by the cellular telephone 102 to separate the call-back telephone number from the text message itself. The predetermined delimiter may be a single character, such as "#," or series of characters, such as "**." Furthermore, it may be a graphic character or icon. The present invention is not limited by the specific delimiter used to separate the call-back telephone number. The call-back number may be placed at the end of the text message with a single delimiter separating the call-back telephone number from the remaining text message. Alternatively, the system 100 may use multiple delimiters thus permitting the extraction of one or more call-back telephone numbers from any location in the text message. A start delimiter indicates the start of a call-back telephone number, while a termination delimiter indicates the end of the call-back telephone number within the text message. The start delimiter and termination delimiter may be the same characters, such as the # character or may be separate characters, such as a # key for the start delimiter and ## keys, an * key, a space, or the like as the termination delimiter.

Figure 3:
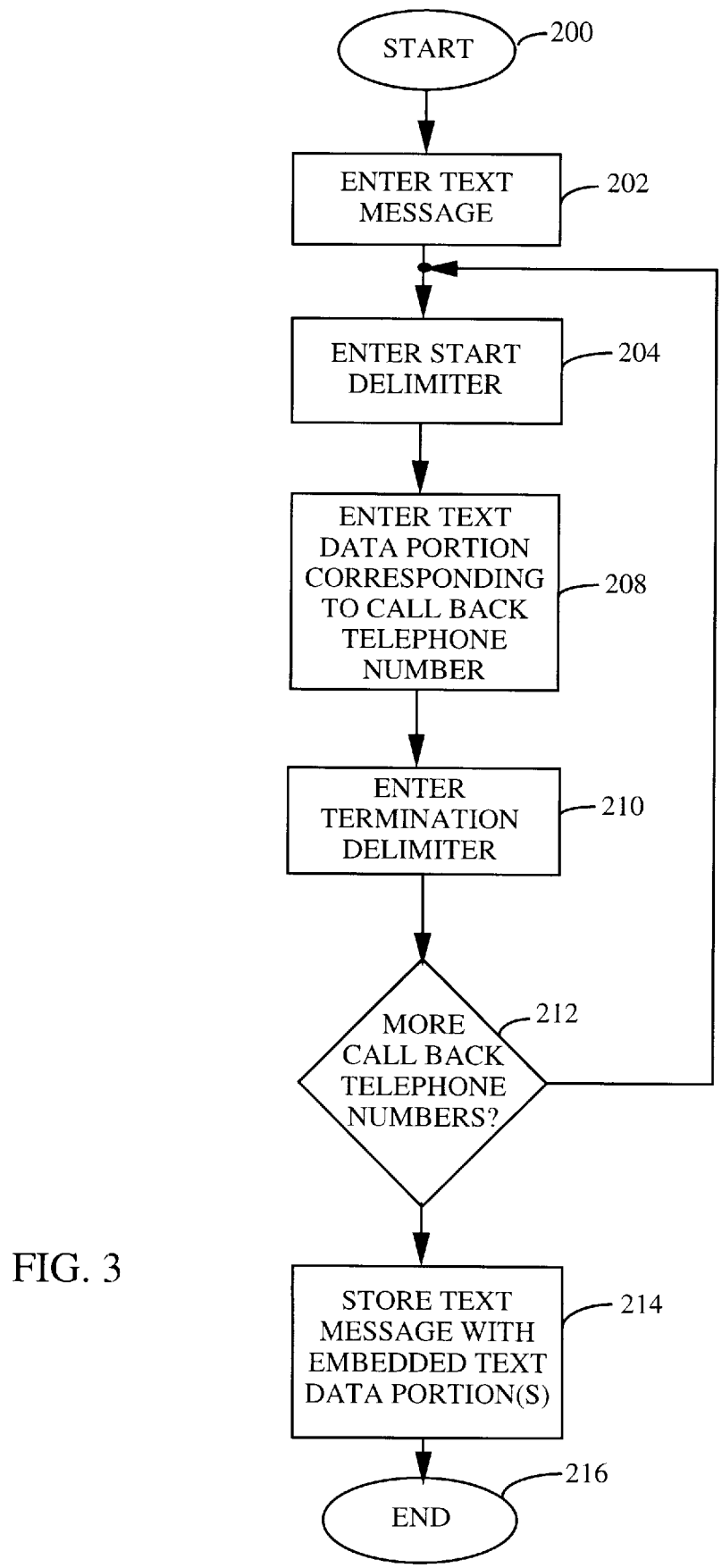
FIG. 3 is a flowchart illustrating the generation of a text message at the cell site controller of FIG. 2.

The operation of the message generator 109 (see FIG. 2) is illustrated in the flowchart of FIG. 3. At a start 200, the message sender and cellular service provider have developed a desired text message. In step 202, the message generator 109 is used to enter a conventional text message. The text message may be stored in a storage location (not shown) within the cell site controller 105. In step 204, the message generator 109 enters the predetermined start delimiter at a selected point in the text message generated in step 202. In step 208, the message generator 109 enters the text data portion corresponding to the call-back telephone number. As previously discussed, the text data portion may be numeric characters indicating the call-back telephone number itself. Alternatively, the text data portion may be alphabetic characters, graphic symbols, icons, or the like corresponding to the call-back telephone number. In step 210, the message generator 109 inserts the predetermined termination delimiter immediately following the text data portion. Thus, a call-back telephone number is embedded within a text message.

In decision 212, the message generator 109 determines whether multiple call-back telephone numbers are to be included within the text message. If multiple call-back telephone numbers are to be included within the text message, the result of decision 212 is YES. In that event, the message generator 109 repeats steps 204–210 for each of the call-back telephone numbers embedded within the text message. If no additional call-back telephone numbers are included within the text message, the result of decision 212 is NO. In that event, in step 214, the message generator 109 stores the text message with the embedded text data portions in a storage location (not shown) within the cell site controller 105. The message generator 109 ends the message generation process at 216. Thus, the message generator 109 provides a simple technique for generating a text message with one or more embedded text data portions. The text message with embedded text data portions can be transmitted by the cellular system transmitter 106 to the cellular telephone 102 using the SMS standard for text messaging.

The system 100 advantageously provides a technique that utilizes current SMS standards for transmitting a text message. However, the text message generated by the message generator 109 (see FIG. 2) contains one or more embedded text data portions corresponding to one or more call-back telephone numbers. The cellular telephone 102 automatically extracts the text data portions and generates call-back telephone numbers therefrom.

Figure 4:
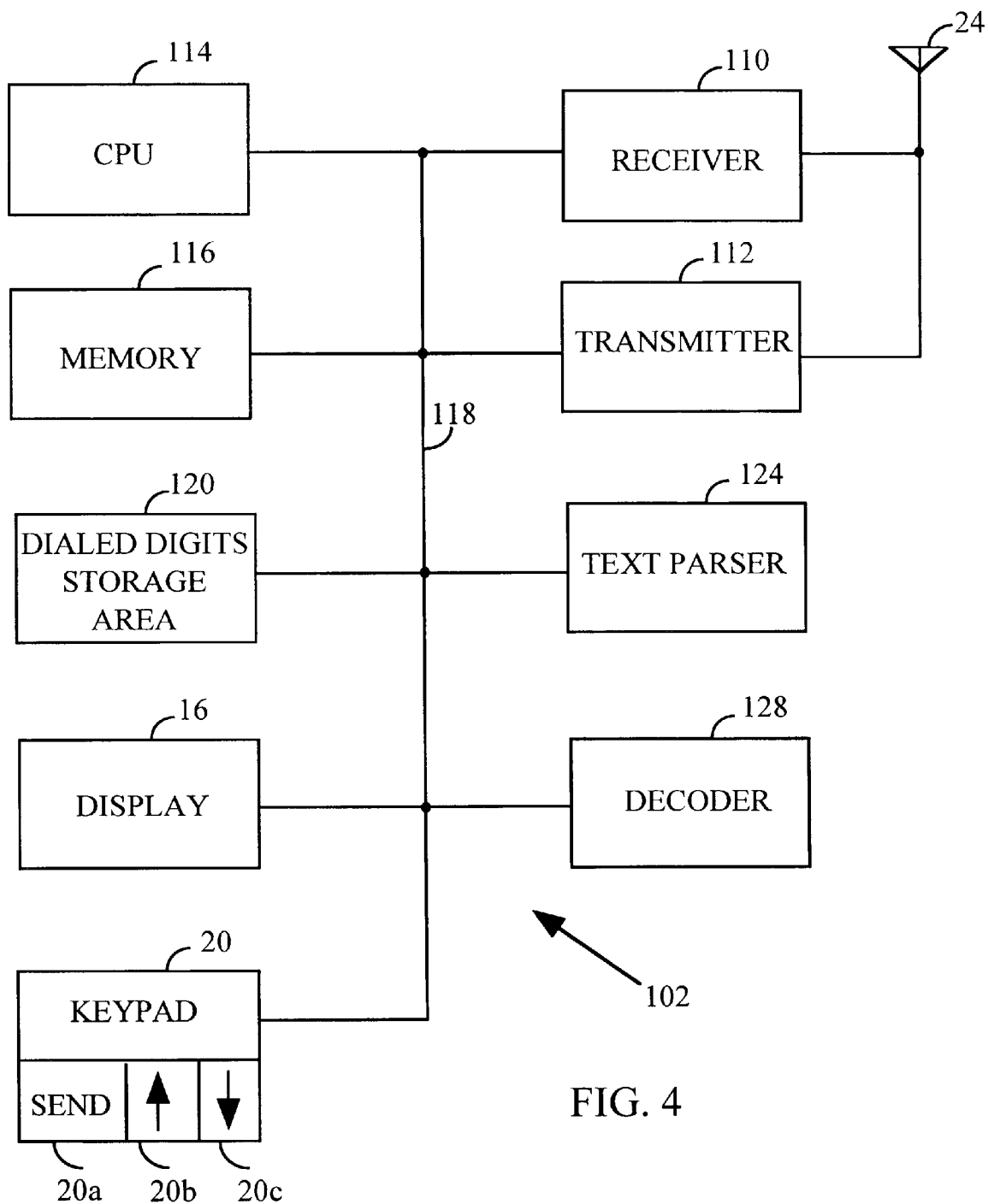
FIG. 4 is a functional block diagram of the cellular telephone of FIG. 2.

The operation of the cellular telephone 102 to detect and extract the call-back telephone number is discussed with reference to the functional block diagram of FIG. 4. The antenna 24 provides radio communication between the cellular telephone 102 and the cellular system network. Contained within the housing 104 is a receiver 110 and a transmitter 112. Both the receiver 110 and the transmitter 112 are coupled to the antenna 24. It should be noted that the receiver 110 and the transmitter 112 may share some circuit components, thus forming a transceiver. However, for the sake of clarity, FIG. 4 illustrates the receiver 110 and the transmitter 112 as separate functional components.

The cellular telephone 102 also includes a central processing unit (CPU) 114, which may be an embedded controller, stand-alone microprocessor, or the like. A memory 116 may include both read-only memory (ROM) and random access memory (RAM).

The CPU 114, memory 116, and other components of the cellular telephone 102 are coupled together by a bus system 118. The bus system 118 carries power and control signals in addition to data signals. Those of ordinary skill in the art will recognize that the bus system 118 may include signals in both digital and analog form. However, for the sake of clarity, the signals are illustrated in FIG. 4 as carried by the bus system 118.

The cellular telephone 102 also includes a dialed digits storage area 120, which contains a destination telephone number to which the cellular telephone will establish a communication. The dialed digits storage area 120 may be part of the memory 116. To place a call, the user may manually enter the desired phone number using the keypad 20 and activate the SEND key 20a. As the user manually enters the digits of the destination telephone number, those digits are temporarily stored in the dialed digits storage area 120 to initiate the communication with the destination telephone, the user activates the SEND key 20a, causing the transmitter 112 to transmit the destination telephone number stored in the dialed digits storage area 120.

Alternatively, as will be discussed in detail below, the cellular telephone 102 can automatically extract text data portions corresponding to a call-back telephone number from a text message and store the extracted call-back telephone number in the dialed digits storage area 120. In this case, the user simply activates the SEND key 20a without having to manually enter the destination telephone number.

The cellular telephone 102 uses the display 16 for numerous functions. The display 16 is used to display received text messages. It should be noted that the received text message may exceed the actual display size of the display 16. In this event, only a portion of the received text message is displayed. The function keys 20b and 20c may be used to scroll through the received text message. The display 16 is also used to indicate the data in the dialed digits storage area 120, such as when the user manually enters a destination telephone number using the keypad 20. In addition, as will be described below in greater detail, the display 16 is used to display multiple call-back telephone numbers. The user selects the desired call-back telephone number using one of the function keys 20b and 20c.

The text message received by the cellular telephone 102 is temporarily stored in the memory 116 and at least partially displayed on the display 16. A text parser 124 analyzes the received text message character by character to detect the predetermined delimiters. The text parser 124 separates the call-back telephone number using the predetermined delimiters and stores the extracted call-back telephone number in the memory 116. As described above, the system 100 can imbed multiple call-back telephone numbers within the text message using multiple start delimiters and stop delimiters. The text parser 124 analyzes the received text message one character at a time until the text parser detects the start delimiter. The text parser extracts the call-back telephone number following the start delimiter until the text parser detects the termination delimiter. The text parser 124 continues this analysis until the entire text message has been analyzed. Thus, following the analysis by the text parser 124, one or more call-back telephone numbers are extracted from the text message.

The extracted call-back telephone numbers are stored within the memory 116. The extracted call-back telephone numbers may be numerical characters, such as a conventional telephone number, or may be in the form of alphabetic or graphic characters. If the received text message contains only a single call-back telephone number in the form of numeric digits, the call-back number may also be stored in the dialed digits storage area 120 as a destination telephone number. A message may be displayed on the display 16 instructing the user to activate the SEND key 20a to establish communication between the cellular telephone 102 and the destination telephone corresponding to the call-back telephone number stored as a destination telephone number in the dialed digits storage area 120.

If the received text message contains multiple numeric telephone numbers, the user may select the desired destination telephone number using the function key 20b. The selected destination telephone number is stored in the dialed digits storage area 120, and the user instructed to activate the SEND key 20a to call the destination telephone corresponding to the selected call-back telephone number stored in the dialed digits storage area 120.

An example received text message shown on the display 16 is illustrated below using numeric characters for the call-back telephone number. The # key is used in this example as a start delimiter and a space as the termination delimiter in the following text message:

Welcome to San Diego! For restaurant information, press the SEND key #5551234 or press the Function key for more information.

The call-back telephone number 555-1234 is extracted by the text parser 124 and stored in the memory 116. The call-back telephone number can also be stored in the dialed digits storage area 120 as the destination telephone number. If the user activates the SEND key 20a in response to the received text message, the transmitter 112 transmits the destination telephone number stored in the dialed digits storage area 120 in a conventional manner. Thus, cellular telephone communications are established between the cellular telephone 102 and the selected destination telephone. If the user selected the function key 20b in response to the instructions on the display 16, an additional portion of the text message, containing one or more additional call-back telephone numbers, may be shown on the display. Thus, the system 100 permits the simple extraction of call-back telephone numbers using predefined delimiters.

The received text message may also include call-back telephone numbers in the form of alphabetic text. An example received text message is illustrated below using the same delimiters as in the previous example:

Welcome to San Diego! For restaurant information, press the SEND key #FOOD or press the Function key for more information.

In this example, the call-back telephone number itself is displayed in the form of alphabetic text. A decoder 128 converts the alphabetic text data portion into numeric digits that can be stored in the dialed digits storage area 120 as the destination telephone number. For example, the decoder may simply convert the alphabetic text into the corresponding keys on the keypad 20. Thus, the text "FOOD" would be converted by the decoder 120a into the digits 3663. The numeric digits 3663 are stored in the dialed digits storage area 120 as the destination telephone number. The user may initiate the cellular telephone communications by simply activating the SEND key 20a. Alternatively, the user may obtain additional information by selecting the function key 20b in accordance with the received text message.

The call-back telephone number may also be shown on the display 16 as a graphic symbol. For example, a graphic symbol such as a pizza can be shown on the display 16 to represent food in the examples presented above. Other symbols, such as an automobile for travel information, a movie reel for theater information, or the like, may also be used by the system 100. The decoder 128 converts the graphic symbol into numeric digits that are stored in the dialed digits storage area 120 as the destination telephone number.

Figure 5A:
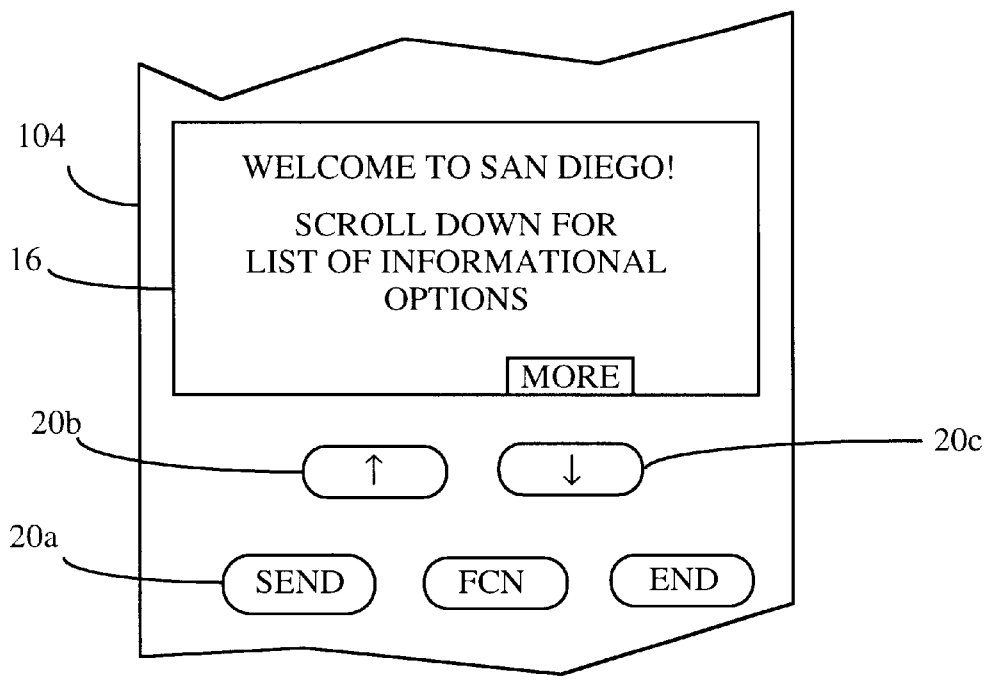
FIGS. 5A–5D are fragmented views of the cellular telephone of FIG. 2 with examples of displayed text messages containing embedded call-back telephone numbers.
Figure 5B:
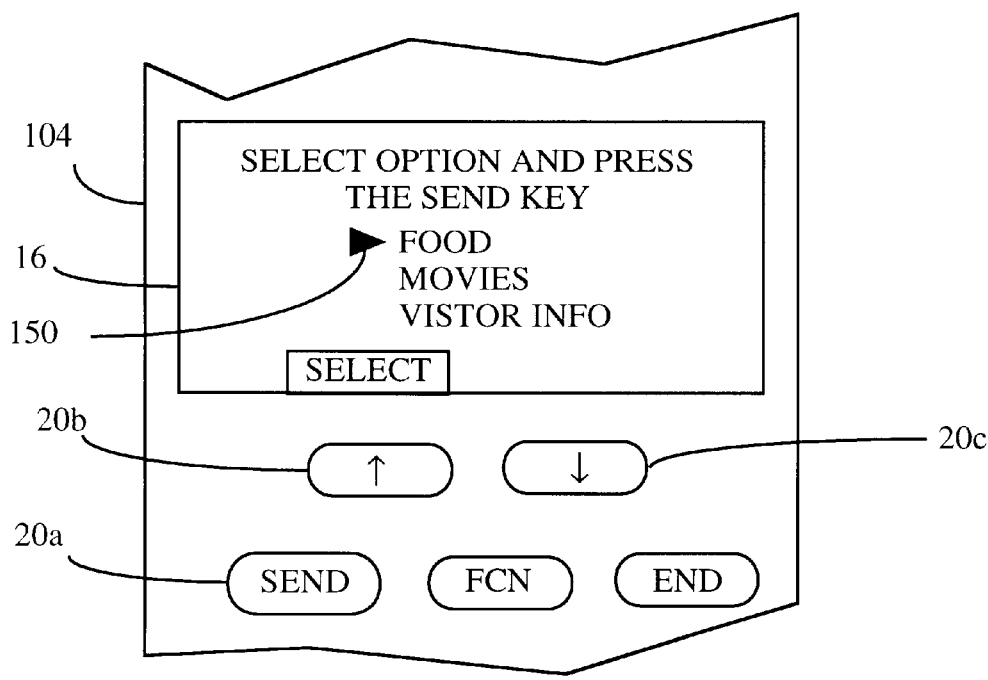

Many different techniques can be used with the system 100 to embed one or more call-back telephone numbers. FIGS. 5A to 5D provide one example of multiple embedded call-back numbers and the interaction between the text message and the keypad buttons. As illustrated in FIG. 5A, the text message on the display 16 provides instructions to the user to scroll down to receive additional information. In the embodiment of FIG. 5A, the user would then press the down arrow key 20c to view an additional portion of the text message. In response to the activation of the down arrow key 20c, the display 16 displays an additional portion of the text message, as shown in FIG. 5B. The portion of the text message illustrated in FIG. 5B provides the user with additional instructions. In the example illustrated in FIG. 5B, the user can obtain additional information regarding food, movies, or visitor information by activating the down arrow key 20c and then the SEND key 20a. In the embodiment of FIG. 5B, marker 150 provides the user with a visual indication of the currently selected call-back telephone number. Other forms of visual indicators, such as reverse video and the like may also be used by the cellular telephone 102.

Figure 5C:
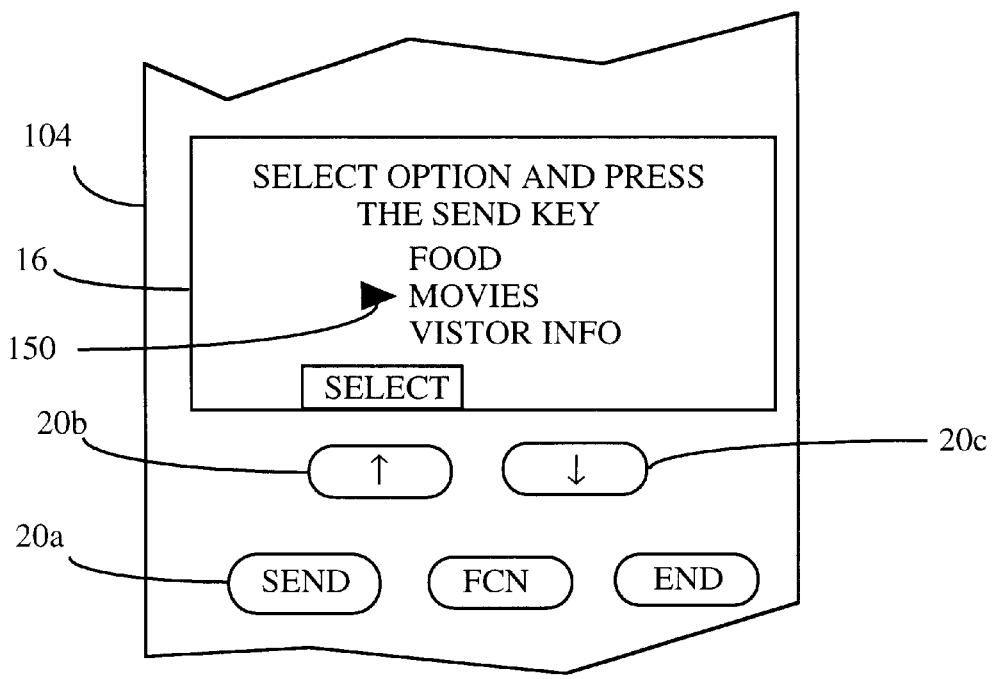

FIG. 5C illustrates the portion of the text message on the display 16 in response to user activation of the down arrow key 20c to select a different call-back telephone number. As shown in FIG. 5C, the marker 150 is now adjacent to the call-back telephone number corresponding to "MOVIES." The user can obtain additional information about movies by activating the SEND key 20a in accordance with the instructions on the display 16.

Figure 5D:
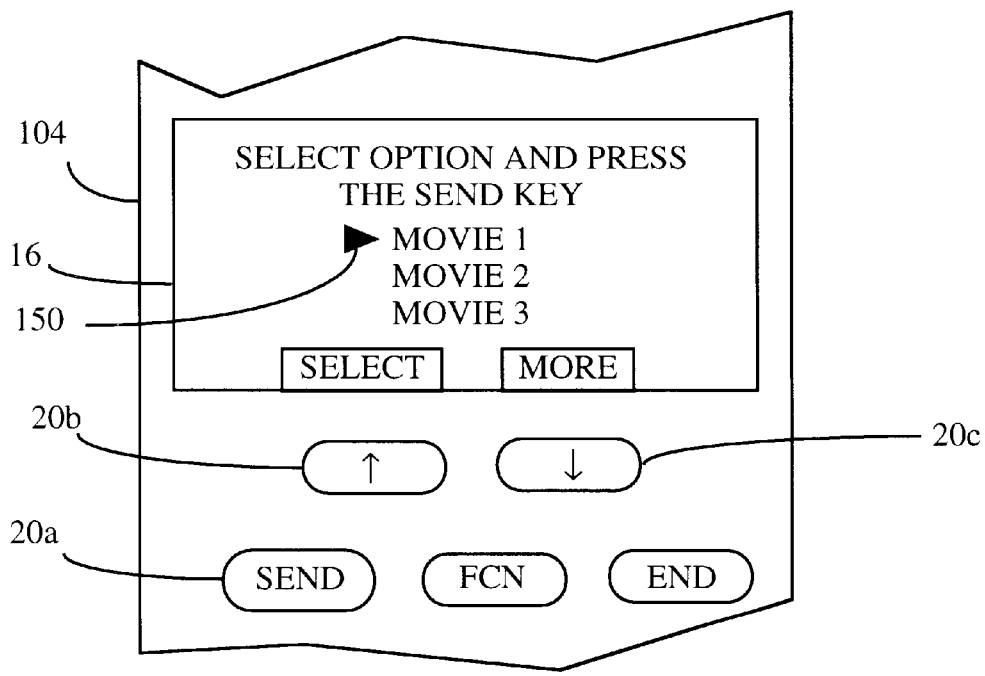

FIG. 5D illustrates an example text message shown on the display 16 in response to the user activation of the SEND key 20a to request additional information about movies. As seen in FIG. 5D, the marker 150 is adjacent to a movie title, illustrated by the reference MOVIE 1. The user can obtain additional information about MOVIE 1, such as times and places of showing, cost information, and the like by activating the SEND key 20a as instructed in the text message on the display 16. Alternatively, the user may activate the down arrow key 20c to select other call-back telephone numbers on the display screen 16. The user may also activate the up arrow key 20b to obtain information about additional movies. Thus, a single text message may include a plurality of call-back telephone numbers as well as instructions to guide the user in the proper selection of a call-back telephone number.

While the examples illustrated in FIGS. 5A to 5D are directed to consumer information, those of ordinary skill in the art will readily recognize that the principles of the present invention extend beyond the examples presented herein. The present invention extends to any implementation wherein one or more call-back telephone numbers are embedded within a transmitted text message. Furthermore, as previously stated, although FIGS. 5A to 5D illustrate the invention with reference to a keypad, the present invention is applicable to all types of user interfaces.

Figure 6A:
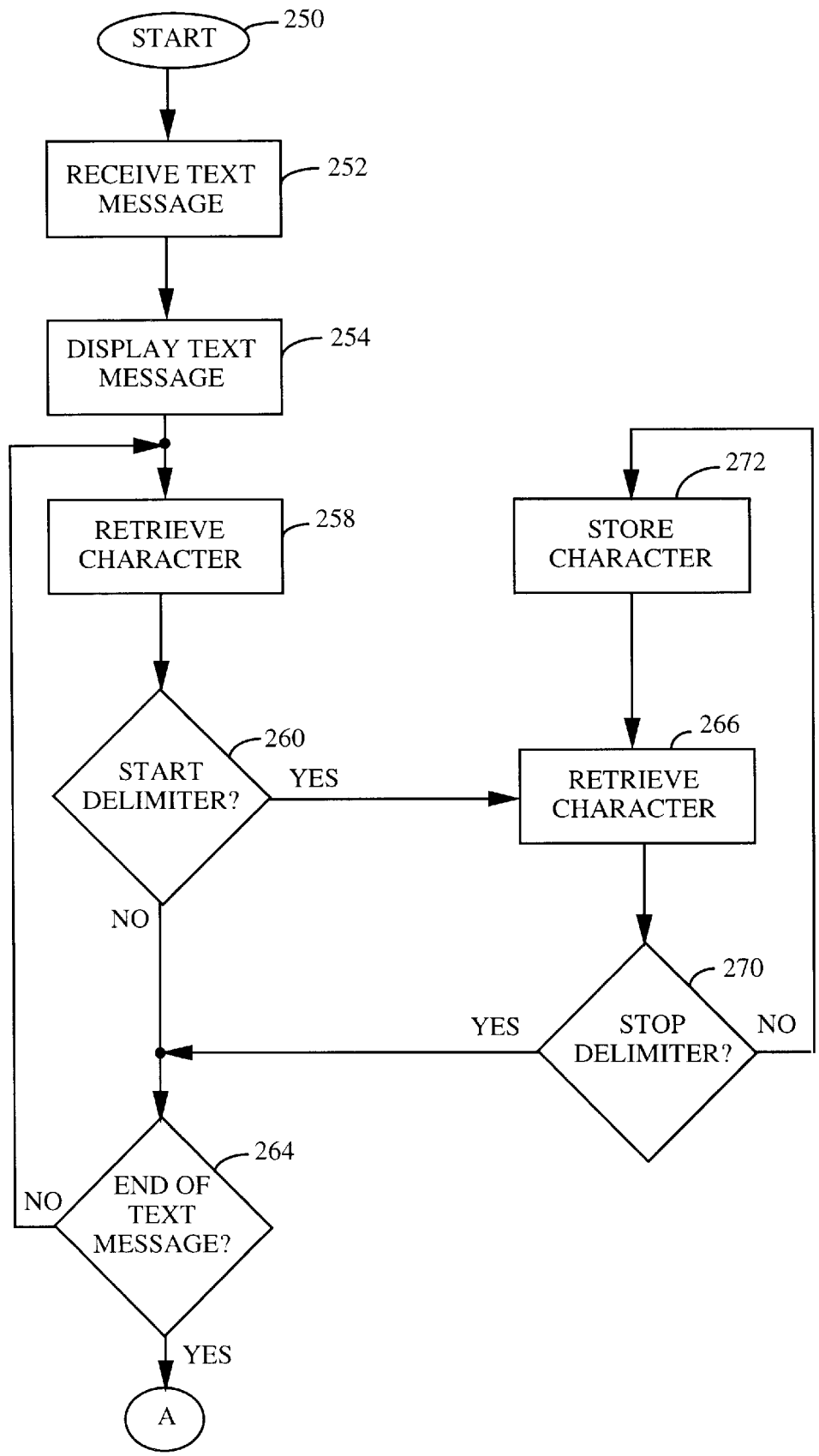
FIGS. 6A–6B are flowcharts illustrating the operation of the cellular telephone of FIG. 2.
Figure 6B:
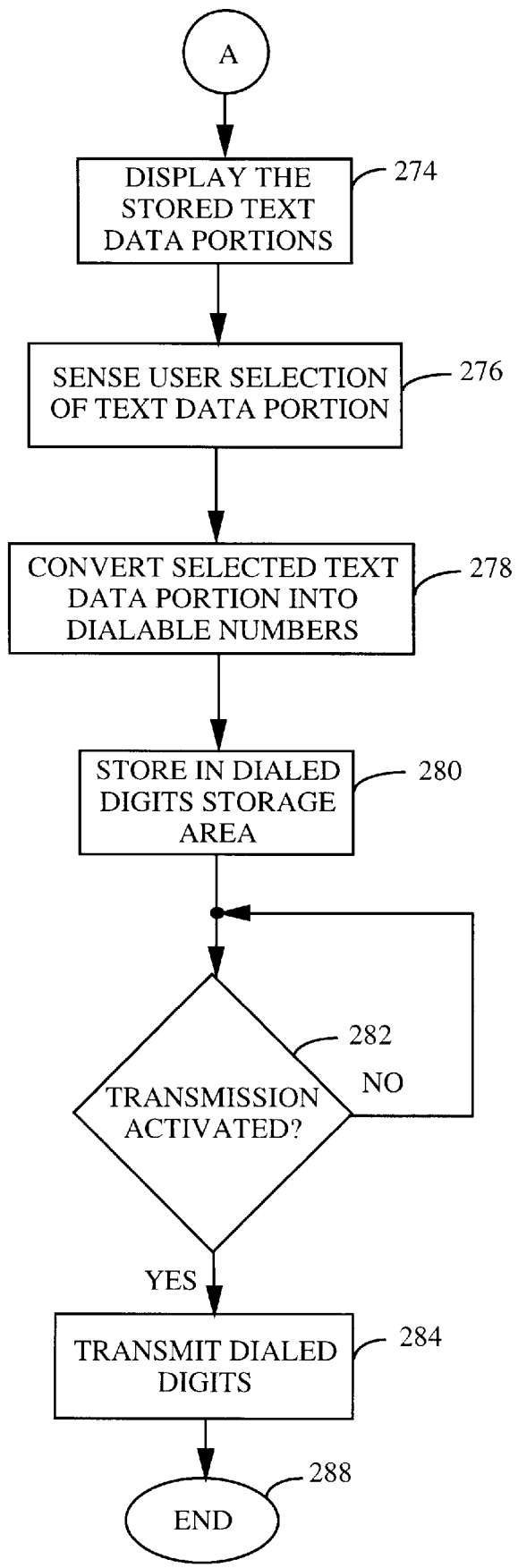

The operation of the cellular telephone 102 to detect and extract call-back telephone numbers is illustrated in the flowchart of FIGS. 6A and 6B. At a start 250 the cellular telephone 102 has established a cellular communication with the cell site controller 105 (see FIG. 2). In step 252, the cellular telephone 102 receives the text message with one or more embedded call-back telephone numbers. In step 254, the cellular telephone 102 displays at least a portion of the text message on the display 16. The received text message is typically stored in the memory 116. A portion (not shown) of the memory 116 may be reserved for use with the display 16. It should be noted that the step 254 of displaying the text message may occur at a later point in the flow, such as after the text parser 124 (see FIG. 4) has processed the text message, but for simplicity, step 254 is shown at the beginning of the flow.

In step 258, the text parser 124 retrieves a character from the received text message. In decision 260, the text parser 124 determines whether the retrieved character is a start delimiter. As described above, the start delimiter may be a single character or graphic icon, such as the # character, or a combination of characters. If a combination of characters are used as the start delimiter, step 258 and decision 260 are repeated until the combination of characters have been identified as a start delimiter. For example, if the characters ## are used as the start delimiter, the text parser 124 will determine that a retrieved character corresponds to the first character in the start delimiter. The text parser repeats step 258 to retrieve the next character to determine whether the next retrieved character is also part of the start delimiter.

If the character or characters are not the start delimiter, the result of decision 260 is NO. In that event, the text parser 124 determines whether the entire text message has been analyzed. In decision 264, the text parser 124 determines whether it is at the end of the text message. If the text parser is not at the end of the text message, the result of decision 264 is NO and the text parser returns to step 258 to retrieve an additional character.

If the one or more characters are the start delimiter, the result of decision 260 is YES. In that event, the text parser 124 enters a loop to extract the embedded text data portion (i.e., numeric characters, alphabetic characters, or graphic symbols) corresponding to a call-back telephone number. In step 266, the text parser 124 retrieves an additional character. In decision 270, the text parser 124 determines whether the character is the stop delimiter. As previously discussed, the system 100 may use the same character or characters to denote both start and stop delimiters. Alternatively, different predetermined characters may be used for the start and stop delimiters, respectively. If the retrieved character is not a stop delimiter, the result of decision 270 is NO. In that event, in step 272, the text parser 124 stores the character in the memory 116. Following storage of the character in the memory 116, the text parser 124 continues in the loop by retrieving a character in step 266 and determining whether the retrieved character is the stop delimiter. Thus, the text parser 124 continuously retrieves and stores characters in the memory 116 until it detects a stop delimiter. When the text parser 124 detects a stop delimiter, the result of decision 270 is YES.

Following the extraction and storage of a call-back telephone number, the text parser 124 moves to decision 264 to determine whether it has reached the end of the text message. If it has not reached the end of the text message, the result of decision 214 is NO. In that event, the text parser 124 returns to step 258 to retrieve additional characters and to decision 260 to determine whether the additional characters include additional start delimiters. Thus, the text parser 124 analyzes the entire received text message and extracts each embedded call-back telephone number.

When the text parser 124 has reached the end of the text message, the result of decision 264 is YES. In that event, in step 274, shown in FIG. 6B, at least some of the extracted call-back telephone numbers may be displayed on the display 16. The extracted call-back telephone numbers may be displayed as numeric characters, alphabetic characters, graphic symbols, or the like. In step 276, the cellular telephone 102 senses user input to select one of the call-back telephone numbers. If only one call-back telephone number was extracted, step 276 may not be required. In step 278, the decoder 128 (see FIG. 4) converts the selected call-back telephone number into a dialable telephone number if required. As previously discussed, the selected text data portion may already be in the form of numeric digits. In that event, the decoder 128 may not be necessary and step 278 may be omitted. However, if the selected text data portion includes alphabetic characters or graphic symbols, the decoder 128 converts the selected text data portion into a dialable telephone number in step 278.

In step 280, the selected call-back telephone number is stored in the dialed digits storage area 120 (see FIG. 4) as the destination telephone number. In decision 282, the cellular telephone 102 determines whether transmission has been activated by sensing activation of the SEND key 20a. If a transmission has not been activated, the result of decision 282 is NO and the cellar telephone 102 awaits transmission activation. If transmission has been activated, the result of decision 282 is YES. In that event, the transmitter 112 (see FIG. 4) transmits the dialed digits in the dialed digits storage area 120 in step 284. The cellular telephone 102 ends the process at 288 with communications having been established between the cellular telephone and the selected call-back telephone.

Thus, the system 100 overcomes the disadvantages of the prior art by utilizing widely accepted technology for text messaging, with system compatible translation capabilities, to include multiple call-back telephone numbers within the text message. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A system for the detection and extraction of call-back telephone numbers from an alphanumeric text message received by a remote station in a wireless communication system, the system comprising:

a receiver for receiving said alphanumeric text message, said alphanumeric text message including a predetermined first delimiter and a telephone number;

a display for displaying at least a portion of said received alphanumeric text message;

a parser for extracting said telephone number from said received alphanumeric text message in response to said first delimiter;

a dialed digits storage area for storing said telephone number; and a transmitter for transmitting said stored telephone number, thereby establishing communication with a destination corresponding to said telephone number.

2. The system of claim 1, further including a user interface, said transmitter transmitting said stored telephone number in response to an operation of said user interface, whereby said communication with said destination is established by a single user interface operation.

3. The system of claim 1 wherein said first delimiter indicates a start of said telephone number, the system further including a predetermined second delimiter to indicate a termination of said telephone number, said parser extracting said telephone number for said received alphanumeric text message in response to both said first and second delimiters.

4. The system of claim 1 wherein said alphanumeric text message includes a plurality of telephone numbers, each preceded by said first delimiter, and said parser extracts each of said plurality of telephone numbers in response to said first delimiter.

5. The system of claim 4, further including a user interface for selecting one of said plurality of telephone numbers.

6. The system of claim 5 wherein said plurality of telephone numbers are text-encoded, and wherein a decoder translates said plurality of text-encoded telephone numbers into a plurality of numeric telephone numbers, and wherein said dialed digits storage area stores a selected one of said plurality numeric telephone numbers.

7. A communication device for the detection and extraction of telephone numbers from a text message received by the communication device in a wireless communication system, the communication device comprising:

a receiver for receiving a text message including a predetermined first delimiter;

a display for displaying at least a portion of said received text message; and a text parser for analyzing said received text message and for extracting therefrom a text data portion in response to said first delimiter, and for generating a call-back telephone number corresponding to said text data portion.

8. The communication device of claim 7, further including:

a dialed digits storage area for storing said call-back telephone number as a destination telephone number to be called by the communication device; and a transmitter for transmitting said stored destination telephone number, thereby establishing communication with a destination corresponding to said destination telephone number.

9. The communication device of claim 8, further including a user interface, said transmitter transmitting said stored telephone number in response to operation of said user interface, whereby said communication between said communication device and said destination telephone is established by a single user interface operation.

10. The communication device of claim 7 wherein said first delimiter indicates a start of said text data portion, and wherein said text message further includes a predetermined second delimiter for indicating a termination of said text data portion, and wherein said text parser extracts said text data portion in response to said first and second delimiters.

11. The communication device of claim 7 wherein said text message includes a plurality of text data portions, each containing said first delimiter, and wherein said text parser separates each of said plurality of text data portions and said display displays each of said plurality of text data portions.

12. The communication device of claim 11, further including a user interface for selecting one of said plurality of displayed text data portions.

13. The communication device of claim 12, further including:

a dialed digits storage area for storing said selected text data portion as a destination telephone number to be called by said communication device; and a transmitter for transmitting said stored destination telephone number, thereby establishing communication with a destination corresponding to said destination telephone number.

14. A system for the insertion and extraction of a call-back telephone number in an alphanumeric text message, the system comprising:

a message generator for generating said alphanumeric text message for transmission to a communication device, said alphanumeric text message including a first text delimiter for delimiting a text data portion corresponding to said call-back telephone number;

a transmitter for transmitting said alphanumeric text message to said communication device;

a receiver in said communication device for receiving said alphanumeric text message from said transmitter;

a display in said communication device for displaying at least a portion of said received alphanumeric text message; and a text parser for analyzing said received alphanumeric text message and for extracting therefrom said text data portion in response to said first delimiter, and for generating a call-back telephone number corresponding to said text data portion.

15. The system of claim 14, further including:

a dialed digits storage area for storing said text data portion as a destination telephone number to be called by said communication device; and a transmitter for transmitting said stored destination telephone number, thereby establishing communication with a destination corresponding to said destination telephone number.

16. The system of claim 14 wherein said alphanumeric text message includes a plurality of text data portions, each containing said first delimiter, and wherein said text parser separates each of said plurality of text data portions and said display displays at least a portion of said plurality of text data portions.

17. A method for the detection and extraction of telephone numbers from a text message received by a communication device in a wireless communication system, the method comprising the steps of:

receiving, in said communication device, a text message including a predetermined first delimiter;

displaying at least a portion of said received text message on a display; and extracting from said received text message a text data portion in response to said first delimiter, said extracted text data portion corresponding to a telephone number.

18. The method of claim 17, further including the steps of:

storing said text data portion as a destination telephone number to be called by the communication device; and transmitting said stored destination telephone number to establish communication with a destination corresponding to said destination telephone number.

19. The method of claim 18 further including the step of sensing operation of a user interface, said transmitting step being performed in response to said sensing step, whereby said communication with said destination is established by a single user interface operation.

20. The method of claim 17 wherein said first delimiter indicates a start of said text data portion and a second delimiter indicates a termination of said text data portion, said method further including the step of extracting said text data portion in response to said second delimiter.

21. The method of claim 17 wherein said text message includes a plurality of text data portions, each containing said first delimiter, said method further including the steps of:

extracting each of said plurality of text data portions in response to said first delimiter; and displaying at least a portion of said plurality of text data portions on said display.

22. The method of claim 21 further including the step of sensing user input on a user interface of said communication device; and selecting one of said plurality of displayed text data portions in response to said sensing step.

23. The method of claim 22, further including the steps of:

storing said selected text data portion as a destination telephone number to be called by said communication device; and transmitting said stored destination telephone number.

24. A method for the insertion and extraction of dialable call-back telephone numbers in a wireless communication system, the method comprising the steps of:

generating a text message for transmission to a communication device, said text message including a first text delimiter to delimit a text data portion corresponding to a call-back telephone number;

transmitting said text message to said communication device;

receiving, at said communication device, said text message;

displaying at least a portion of said received text message on a display;

extracting said text data portion from said received text message in response to said first delimiter; and generating a call-back telephone number corresponding to said extracted text data portion.

25. The method of claim 24, further including the steps of:

storing said text data portion as a destination telephone number to be called by said communication device; and transmitting said stored destination telephone number to establish communication with a destination corresponding to said destination telephone number.

26. The method of claim 24 wherein said text message includes a plurality of text data portions, each containing said first delimiter, said method further including the steps of:

extracting each of said plurality of text data portions in response to said first delimiter; and displaying at least a portion of said plurality of text data portions on said display.

* * * * *